United States Patent Office 2,812,897
Patented Nov. 12, 1957

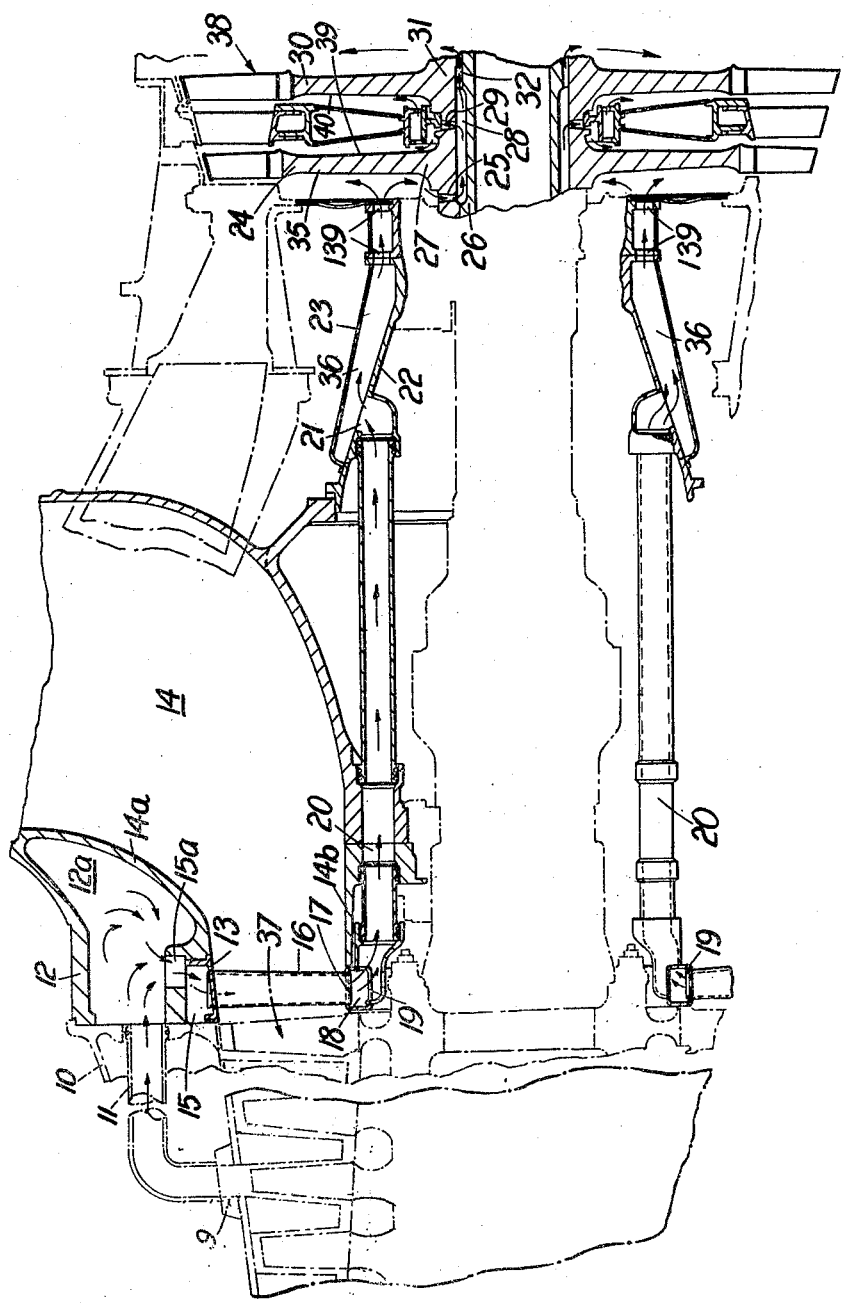

2,812,897

GAS TURBINE ENGINES

Lachlan McTavish Cameron, Bristol, England, assignor to The Bristol Aeroplane Company Limited, Bristol, England, a British company Application February 1, 1954, Serial No. 407,501

Claims priority, application Great Britain February 17, 1953

9 Claims. (Cl. 230—116)

This invention relates to gas turbine engines and concerns anti-icing and turbine cooling arrangements for gas turbine engines used for aircraft propulsion.

Hitherto, it has been proposed to lead relatively hot air, tapped from a final or intermediate stage of a compressor, through hollow inlet guide vanes positioned in the air intake of the compressor, after which it either passes into the ingoing airstream through apertures in the leading or trailing edges of these guide vanes or passes to the exterior of the engine. It has also been proposed to lead relatively cool air from an earlier stage of the compressor to the turbine to cool its rotor discs.

The object of the present invention is to provide an improved anti-icing and turbine cooling arrangement.

According to the present invention, there is provided in a gas turbine engine means to convey air from a final or intermediate stage of a compressor of the engine and bring said air firstly into heat exchange relationship with parts of the engine requiring heating, and thence into heat exchange relationship with parts of the engine requiring cooling.

According to a feature of the present invention, the tapped air may be led through hollow inlet guide vanes in the air intake of the engine to heat the guide vanes, and then to a turbine of the engine to cool the turbine.

In passing through the guide vanes the air heats the external surfaces of the guide vanes and thereby prevents or reduces the formation of ice thereon. At the same time the air is cooled by the ambient air entering the compressor and is then in a suitable condition for cooling the turbine.

According to another feature of the present invention, said tapped air, before passing through said hollow guide vanes, may enter an annular manifold to which the radial outer ends of the guide vanes are attached, said manifold communicating with the interior of said guide vanes, and the air passing from said manifold through said guide vanes and thence to said turbine.

According to yet another feature of the present invention, said manifold may be a hollow walled part of an air intake casing for said air intake of the engine.

According to yet another feature of the present invention, the interior of said guide vanes may communicate with a second annular manifold to which the inner radial ends of said guide vanes are attached, in which case, said tapped air, after passing through said guide vanes enters said second annular manifold and thence passes to the turbine.

According to yet another feature of the present invention, conduit means communicating with said second annular manifold may extend from said second annular manifold to a position adjacent the high pressure end of the rotor hub of said turbine to lead air from the second annular manifold to said turbine.

The invention may be applied to a gas turbine engine of the type wherein the air intake end of the compressor is adjacent to the turbine, in which case the means to convey the air from the inlet guide vanes to the turbine may lead substantially directly to the turbine. When this feature is adopted there is the particular advantage that the length of ducting required between the inlet guide vanes and the turbine is relatively short.

By way of example, one embodiment of the present invention will now be described with reference to the accompanying drawing which is a partial view in cross-section of a gas turbine engine having an anti-icing turbine-cooling arrangement in accordance with the present invention.

Referring to the drawing, the gas turbine engine is of the type in which an annular air intake duct 14 of an axial flow compressor, the first row of moving blades of which is shown at 37, is adjacent to the turbine which is generally indicated at 38. A tapping 9 at a suitable point on the compressor casing 10 communicates through a pipe 11 to the interior of a hollow wall part of an air intake casing 12. This casing forms an annular manifold 12a the inner periphery of which is formed by a blade-supporting ring 13, this being so seated in a groove 15 in the intake casing that it is flush with the outer wall 14a of the air intake duct 14. The bottom of the groove is provided with a plurality of apertures 15a for the passage of air from the main part of the manifold 12a into the groove. The ring 13 is perforated to accommodate the outer radial ends of a set of hollow inlet guide vanes 16, the ends of the vanes 16 being open so that the manifold 12a is in communication with the interior of the vanes. The opposite ends of the guide vanes, which are also open, project into apertures 17 in the outer periphery of a second annular manifold 18 and communicate the interior of the vanes therewith. The manifold 18 is housed in and lies flush with the inner wall 14b of the air intake duct 14. The inner periphery of the manifold 18 is provided with a pair of diametrically opposite apertures 19, each of which provides a passage in to conduit means comprising for each aperture 19 a pipe 20 and an annular header chamber 36 formed between a bearing support cone 22 and a frusto-conical member 23. The pipes 20 each lead directly to an aperture 21 in the cone 22, and chamber 36 is provided with a number of apertures 39 at a position adjacent the high pressure end of the turbine rotor hub, the apertures 39 being arranged to direct air on to the upstream face 35 of the first stage turbine disc 24 at the high pressure end of the turbine. A number of radial passages 25 are provided in the upstream end of the hub 27 of the disc 24, these passages 25 communicating with a recess 28 formed in a shaft part 26 extending through bores in the first and second stage turbine disc hubs 27 and 31. In addition, a number of radial passages 29 are provided between the rear part of the hub 27, and the front part of the turbine hub 31, these passages connecting the recess 28 with the space between the first and second stage turbine discs 24 and 30 respectively.

In operation hot compressed air tapped from the tapping 9 which is shown, by way of example, as being at an intermediate stage of the compressor passes under pressure through pipe 11 into the manifold 12a forming the hollow air intake casing 12 where it may circulate and thus transfer heat to the outer wall 14a of the duct 14 thereby preventing or reducing the formation of ice thereon. The air then passes through the apertures 15a into the groove 15 and so through the perforations in the ring 13 into the hollow inlet guide vanes 16 of the compressor. The heating effect of the hot air passing through the guide vanes is sufficient to prevent the formation of ice on their exterior surfaces. At the same time, the cold ambient air entering the compressor through the air intake duct 14 cools the hot air flowing within the guide vanes. This cooled air passes through the annular manifold 18 into the pipes 20 and thus to the chamber 36 and on to the upstream face 35 of the disc 24. At this point, the air is divided, one part of the air passing outwardly over the upstream face 35 of the disc 24, thereby cooling this face, and then escaping into the main gas stream into the turbine, while another part passes inwardly through passages 25 into the recesses 28 and through passages 29 and then over the downstream face of the disc 24 and the upstream face 40 of the disc 30 to cool these faces, the air passing outwardly through the space between the discs 24 and 30 and escaping into the main gas stream passing through the turbine. The flow of air through passages 25, recess 28 and passages 29 is assisted by the reduced pressure existing in the second stage of the turbine.

Cooling air from recess 28 also passes through passages 32 and then outwardly over the downstream face of the disc 30 to cool this face, the air then escaping into the main gas stream as before.

I claim:

1. In a gas turbine engine comprising an air-intake, a ring of hollow inlet guide vanes in said air-intake, a compressor and turbine; a compressed air tapping on said compressor, first conduit means communicating said tapping with the interior of said hollow inlet guide vanes to lead air compressed in said compressor from said tapping to the interior of said guide vanes, and second conduit means communicating with the interiors of said guide vanes to receive therefrom, and lead into heat exchange relationship with said turbine, air led to the interiors of the guide vanes by said first conduit means.

2. In a gas turbine engine comprising an air-intake, a ring of hollow open-ended inlet guide vanes in said air-intake, said guide vanes each having one end disposed radially outwardly of its other end, a compressor, and a turbine; a compressed air tapping on said compressor, an annular manifold communicating with the interiors of said guide vanes through their radially outer ends, duct means communicating said tapping with said manifold to lead air compressed in said compressor from said tapping to said manifold, and conduit means communicating with the interiors of said guide vanes through their radially inner ends to receive from the interiors of said guide vanes and lead into heat exchange relationship with said turbine air passing from said manifold through said guide vanes.

3. In a gas turbine engine comprising an air-intake, a ring of hollow open-ended inlet guide vanes in said air-intake, a compressor and a turbine, said guide vanes each having one end disposed radially outwardly of its other end; a compressed air tapping on said compressor, an annular hollow wall part constituting at least part of a wall of said air-intake, said wall part supporting the radially outer ends of said guide vanes and the interior of the wall part communicating with the interiors of the guide vanes through their radially outer ends, duct means communicating said tapping with the interior of said hollow wall part to lead air compressed in said compressor from said tapping to the interior of said wall part, and conduit means communicating with the interiors of said guide vanes through their radially inner ends to receive from the interiors of said guide vanes and lead into heat exchange relationship with said turbine air passing from the interior of said hollow wall part through said guide vanes.

4. In a gas turbine engine comprising an air-intake, a ring of hollow open-ended inlet guide vanes in said air-intake, a compressor and a turbine, said guide vanes each having one end disposed radially outwardly of its other end; a compressed air tapping on said compressor, a first annular manifold supporting the radially outer ends of said guide vanes and communicating with the interiors of said guide vanes through their radially outer ends, first duct means communicating said tapping with said first manifold to lead air compressed in said compressor from said tapping to said first manifold, a second annular manifold supporting the radially inner ends of said guide vanes and communicating with the interiors of the guide vanes through their radially inner ends, and second duct means communicating with said second manifold to receive from the second manifold and lead into heat exchange relationship with said turbine air passing from said first manifold through said guide vanes into said second manifold.

5. A gas turbine engine as claimed in claim 4, wherein said first manifold constitutes a hollow wall part forming at least part of a wall of said air-intake.

6. In a gas turbine engine comprising an air-intake, a ring of hollow open-ended inlet guide vanes in said air-intake, a compressor and a turbine, said guide vanes each having one end disposed radially outwardly of its other end, a compressed air tapping on said compressor, a first annular manifold supporting the radially outer ends of said guide vanes and communicating with the interiors of said guide vanes through their radially outer ends, first duct means communicating said tapping with said first manifold to lead air compressed in said compressor from said tapping to said first manifold, a second annular manifold supporting the radially inner ends of said guide vanes and communicating with the interiors of the guide vanes through their radially inner ends, and second duct means communicating with said second manifold and extending to a position adjacent the high pressure end of the rotor hub of said turbine to direct air passing from said first manifold through said guide vanes into said second manifold onto the turbine rotor.

7. In a gas turbine engine comprising an air-intake, a ring of hollow open-end guide vanes in said air-intake, said guide vanes each having one end disposed radially outwardly of its other end, a compressor and an axial flow turbine comprising a rotor having at least two axially spaced blade-carrying discs; a compressed air tapping on said compressor, a first annular manifold supporting the radially outer ends of said guide vanes and communicating with the interiors of said guide vanes through their radially outer ends, first duct means communicating said tapping with said first manifold to lead air compressed in said compressor from said tapping to said first manifold, a second annular manifold supporting the radially inner ends of said guide vanes and communicating with the interiors of said guide vanes through their radially inner ends, second duct means communicating with said second manifold and extending to a position adjacent the high pressure end of the hub of said rotor to direct air passing from said first manifold through said guide vanes into said second manifold onto the upstream face of the blade-carrying disc at the high pressure end of said rotor, passages in the hub of said rotor communicating the upstream side of the blade-carrying disc at the high pressure end of said rotor with a space between the blade-carrying disc at the high pressure end of said rotor and the next adjacent disc to lead part of the air directed onto the upstream face of the blade-carrying disc at the high pressure end of said rotor to said space, means to guide one part of the air led to said space by said passage means radially outwardly over the downstream face of the blade-carrying disc at the high pressure end of said rotor and means to guide another part of the air led to said space by said passage means radially outwardly over the upstream face of said next adjacent disc.

8. In a gas turbine engine comprising an air-intake, a ring of hollow open-ended guide vanes in said air-intake, said guide vanes each having one end disposed radially outwarly of its other end, a compressor and an axial flow turbine comprising a rotor having at least two axially-spaced blade-carrying discs; a compressed air tapping on said compressor, an annular hollow wall part constituting at least part of a wall of said air-intake, said wall part supporting the radially outer ends of said guide vanes and the interior of the wall part communicating with the interiors of the guide vanes through their radially outer ends, first duct means communicating said tapping with the interior of said wall part to lead air compressed in said compressor from said tapping to the interior of said wall part, an annular manifold supporting the radially inner ends of said guide vanes and communicating with the interiors of said guide vanes through their radially inner ends, second duct means communicating with said manifold and extending to a position adjacent the high pressure end of the hub of said rotor to direct air passing from the interior of said hollow wall part through said guide vanes into said manifold on to the upstream face of the blade-carrying disc at the high pressure end of said rotor, passages in the hub of said rotor communicating the upstream side of the blade-carrying disc at the high pressure end of said rotor with a space between the blade-carrying disc at the high pressure end of said rotor and the next adjacent disc to lead part of the air directed onto the upstream face of the blade-carrying disc at the high pressure end of said rotor to said space, means to guide one part of the air led to said space by said passage means radially outwardly over the downstream face of the blade-carrying disc at the high pressure end of said rotor and means to guide another part of the air led to said space by said passage means radially outwardly over the upstream face of said next adjacent disc.

9. In a gas turbine engine comprising an air-intake, a ring of hollow guide vanes in said air-intake, a compressor and a turbine, said engine being of the kind in which the air-intake is positioned adjacent to the turbine; a compressed air tapping on said compressor; first conduit means communicating said tapping with the interiors of said hollow inlet guide vanes to lead air compressed in said compressor from said tapping to the interior of said guide vanes, and second conduit means communicating with the interiors of said guide vanes to receive therefrom and lead substantially directly into heat exchange relationship with said turbine air led to the interiors of the guide vanes by said first conduit means.

References Cited in the file of this patent
UNITED STATES PATENTS

| | | |
|---|---|---|
| 2,599,470 | Meyer | June 3, 1952 |
| 2,620,123 | Parducii | Dec. 2, 1952 |
| 2,636,665 | Lombard | Apr. 28, 1953 |
| 2,639,579 | Willgoos | May 26, 1953 |
| 2,657,901 | McLeod | Nov. 3, 1953 |
| 2,680,001 | Batt | June 1, 1954 |
| 2,718,350 | Burgess | Sept. 20, 1955 |